United States Patent [19]
Eek-Vancells

[11] Patent Number: 5,686,554
[45] Date of Patent: Nov. 11, 1997

[54] PROCESS FOR THE MANUFACTURE OF PARAFORMALDEHYDE

[75] Inventor: Luis Eek-Vancells, Barcelona, Spain

[73] Assignee: Patentes Y Novedades, S.L., Barcelona, Spain

[21] Appl. No.: 499,759

[22] Filed: Jul. 10, 1995

[30] Foreign Application Priority Data

Dec. 9, 1994 [ES] Spain ...................... 9402512

[51] Int. Cl.$^6$ .......................... C08G 12/02; C08G 12/56
[52] U.S. Cl. .................. 528/243; 528/232; 528/452; 528/503; 568/457; 568/458; 568/449; 526/65; 526/66
[58] Field of Search .................... 528/243, 232, 528/490; 568/457, 458, 449; 526/65, 66

[56] References Cited

U.S. PATENT DOCUMENTS 3,772,392  11/1973  Paseologo et al. ................. 260/615.5
4,550,213  10/1985  Thigpen et al. ........................ 568/458

*Primary Examiner*—James J. Seidleck
*Assistant Examiner*—Duv Truong
*Attorney, Agent, or Firm*—Staas & Halsey

[57] ABSTRACT

The process comprises providing a formaldehyde solution at a concentration of 80–89%; heating the solution to a temperature of 80°–100° C.; pouring the heated solution over heated zones on a metal belt conveyor travelling from the heated zones to other, chilled zones. The formaldehyde solution is preferably previously mixed with a catalyst.

11 Claims, 1 Drawing Sheet

PROCESS FOR THE MANUFACTURE OF PARAFORMALDEHYDE

FIELD OF THE INVENTION

The invention relates to a process for the manufacture of paraformaldehyde, particularly for the continuous manufacture of paraformaldehyde with a purity ranging from 80 to 89 wt %.

Paraformaldehyde is a polymer of formaldehyde, with a degree of polymerization ranging from 8 to 100, and a purity ranging from 80 to 98 wt %. The most frequent types on the marketplace are those having a purity ranging from 89–93 wt %, the higher purity types being special types.

Paraformaldehyde is a product allowing concentrated formaldehyde to be used in a large number of applications, provided the use is simple, particularly it is required to be readily soluble. It is known that the higher purity qualities are less soluble than the normal ones, but even in the latter there is a fraction of high molecular weight polymers which are insoluble or scarcely soluble under normal conditions of use, such as is the case of resin manufacture.

On the other hand, if the product has a low purity, less than 89 wt %, although it is more soluble, it is too soft and agglutinates during storage and the carriage and handling thereof is troublesome.

REFERENCE TO PRIOR ART

Paraformaldehyde is always manufactured from concentrated formaldehyde solutions. These are formed by low pressure distillation of the dilute formaldehyde solutions obtained in the conventional formaldehyde manufacturing plants. The paraformaldehyde is prepared from the concentrated solution, with 80–89 wt % of formaldehyde, in one of the following ways:

The first, and oldest, way is to solidify the concentrated formaldehyde solution batchwise in a reaction vessel. The solidification may be carried out either in the reaction vessel itself with or without catalysts, whereby the vessel will be equipped with some type of stirrer blade to break up the mass formed, or by pouring the reaction vessel content on a chilled surface, provided with a flaker. In another process, the concentrated solution is poured over a heated roller device which evaporates part of the concentrated solution and leads to a very pure formaldehyde product (FR-P-2 067 169). The use of double screw kneaders has also been disclosed (U.S. Pat. No. 2,992,277) and even the use of an extruder (CN-1 050 201). Depending on the devices used, the product is a powdered, lumpy or flaked product (U.S. Pat. No. 2,992,277 double screw kneader). These latter named processes may also be carried out continuously, but in all cases, the end product must be subjected to a subsequent drying process to obtain a sufficiently hard product which will not form lumps during storage and transportation. Generally, the reaction vessels of this type form high molecular weight, highly acidic, sparsely soluble products, unless alkaline substances, promoting depolymerization on being dissolved in water, are incorporated in them.

Another type of generalized process currently uses a prilling tower which is fed with the concentrated formaldehyde solution. The prills dropping through the tower are cooled in a current of air. It is a continuous process providing great advantages over the previous ones. A product having a spheroidal physical form is obtained, which is very advantageous for subsequent handling. Nevertheless, the freshly produced material is still too soft and must be subsequently matured, either in a fluidized bed, or on conveyor belts. In another variation of the process (U.S. Pat. No. 3,772,392), there is disclosed the addition of reaction products between the formaldehyde and an amine as regulators of the molecular weight of the paraform. This agent must be prepared in a separate process which lasts for 20 hours at 100° C. Once formed it is added to the concentrated formaldehyde solution, which is crushed in a prilling tower. But in this case also, the product obtained must be matured in a fluidized bed or on a belt conveyor for a certain period of time. Likewise, in low purity products, less than 87–89 wt %, the prills stick together and form lumps which do not flow freely and end up by producing an unusable pasty block. The prilling process is the one which has produced most variants, see U.S. Pat. No. 4,550,213. and DE-P-3 925 966 for a summary thereof. These patents update the many variations existing on the manufacturing process of paraformaldehyde. A reading thereof shows that the problem is always the same, namely, the lumping together of the particles, making subsequent treatments difficult to carry out. Even in DE-P-3 925 966, which claims to have improved on the art, concentrations of over 83 wt % have to be used to obtain particles which do not lump, and this in spite of operating with product recirculation, a fact complicating the plant and making it more expensive.

For many applications, i.e. the manufacture of urea-formaldehyde, melamine-formaldehyde or phenol-formaldehyde resins and glues for the manufacture of particle board, the paraformaldehyde does not need to be so pure as that which is obtained in the prilling towers. It is generally sufficient for it to be over 80 wt %, which is sufficient for the resin manufacturers not to have to pay for the carriage of water in the normal 40 wt % commercial formaldehyde solution, nor to have to distill the excess water from the reaction.

As said above, these low formaldehyde purity products may not be produced with the prilling technique, due to the ease with which the particles lump together. Likewise, the low purity products obtained with the batch and semicontinuous methods, such as with the flaker, cannot be handled. For them to be suitable for handling, they need either the addition of catalysts or a long dwell time in the reaction vessel, or both at the same time, whereby to achieve a product which is sufficiently polymerized but at the same time sufficiently soft to provide flakes, which must then be dried to obtain the hard handlable product.

Likewise, the processes using apparatus with heated rollers or extruders also require a subsequent treatment, such as auxiliary driers, to achieve a product of adequate concentration and hardness. In general, all these processes are batchwise.

Finally, a process which does allow continuous operation with less concentrated solutions of formaldehyde is disclosed in U.S. Pat. No. 3,001,235. Here a hot concentrated solution of formaldehyde is held in a vatlike vessel in which a suitably chilled rotary drum is partly submerged. A thin layer of solid precipitates on the drum and is removed by a scraper blade, whereby still soft flakes are obtained. These flakes are thereafter dried on a perforated belt drier by passage of a hot dry inert gas therethrough.

This process has several drawbacks.

In the first place, the concentrated formaldehyde solution has to be kept hot in a vessel, with the consequent release of formaldehyde vapours, which must be suitably collected and it also causes an increase in acidity. Secondly, to achieve a low solids concentration, i.e. 80 wt %, the drum must be chilled to very low temperatures, −10° C., with the consequent need to use costly cooling baths and refrigeration equipment. Thirdly, the need to use air or an inert gas, $N_2$, if it is desired to achieve a substantial reduction of the acidity produced.

SUMMARY OF THE INVENTION

The invention seeks to overcome the above described limitations. This aim is achieved by a process of the type mentioned at the beginning, which comprises the following steps: providing a formaldehyde solution of a concentration substantially the same as the purity of the paraformaldehyde to be obtained; heating said solution to a temperature ranging from 80° C. to 100° C.; pouring said heated solution over a metal conveyor belt travelling from first heated zones to second chilled zones, said pouring being carried out on one of said first zones.

According to a preferred feature of the invention, said formaldehyde solution is placed in a mixer, followed by a catalyst; said formaldehyde solution and said catalyst are mixed together at a temperature ranging from 80° C. to 100° C., until a homogenized mixture is obtained; and, while maintaining said temperature range, said homogenized mixture is poured over one of said first zones of said metal belt conveyor. The use of the catalyst is particularly preferred when it is intended to obtain paraformaldehyde of a purity below 87 wt %.

According to the invention, the catalyst is a strong basic hydroxide or an amine having a pKa ranging from 10.4 to 11.3.

Also according to the invention preferred among the primary amines are methylamine, ethylamine, n-propylamine, n-butylamine, iso-butylamine and tert-butylamine; among the secondary amines are dimethylamine, diethylamine, di-n-propylamine, di-isopropylamine and dibutylamine; among the tertiary amines are triethylamine and triethanolamine.

According to another preferred feature of the invention, the amine concentration in said homogenized mixture ranges from 6.0 to 20.0 meq/kg and more particularly, it is around 9.5 meq/kg.

The invention also contemplates that the first heated zones be held at a temperature ranging from 70° to 90° C. and that the second zones be held at a temperature ranging from 25° to 35° C.

Some special aspects of the invention are to be found in the use of a metal belt conveyor receiving the concentrated formaldehyde solution at one end and in the temperature control along said belt. It has been surprisingly observed that if a first zone of the belt is kept hot and there is cooling in the following ones, the solid product formed in the belt comes loose alone on reaching the other end of the belt and a regular breaker is sufficient to reduce the product to the desired size. On the contrary, if it is cooled all along the belt, the end product is soft and must be subsequently dried like in other processes. With the present process, the paraformaldehyde obtained does not lump either during or after manufacture and does not require any subsequent drying or treatment.

If the formaldehyde solution concentration is less than 87 wt % and depending thereon, it is desirable to add some type of catalyst to accelerate a hardening of the mass. If the concentration is higher, the catalyst is not needed, although the incorporation thereof accelerates the process. Furthermore, as said above, to achieve this hardening it is necessary to keep a first part of the belt hot, which causes an increase in the degree of product polymerization, making it easier to treat afterwards. No subsequent treatment or drying with inert gases is required, since the product falling from the belt is sufficiently hard for handling, bagging and carriage and has practically the same concentration of the initially desired one.

The belt may be cooled with normal process water or with water cooled to 5°–10° C.

To avoid the slight release of formaldehyde vapours occurring, it is desirable to install a gas absorption hood. These gases are subsequently scrubbed in an appropriate scrubber or sent to the existing formaldehyde manufacturing plant.

DETAILED DESCRIPTION OF THE INVENTION

Figure 1:
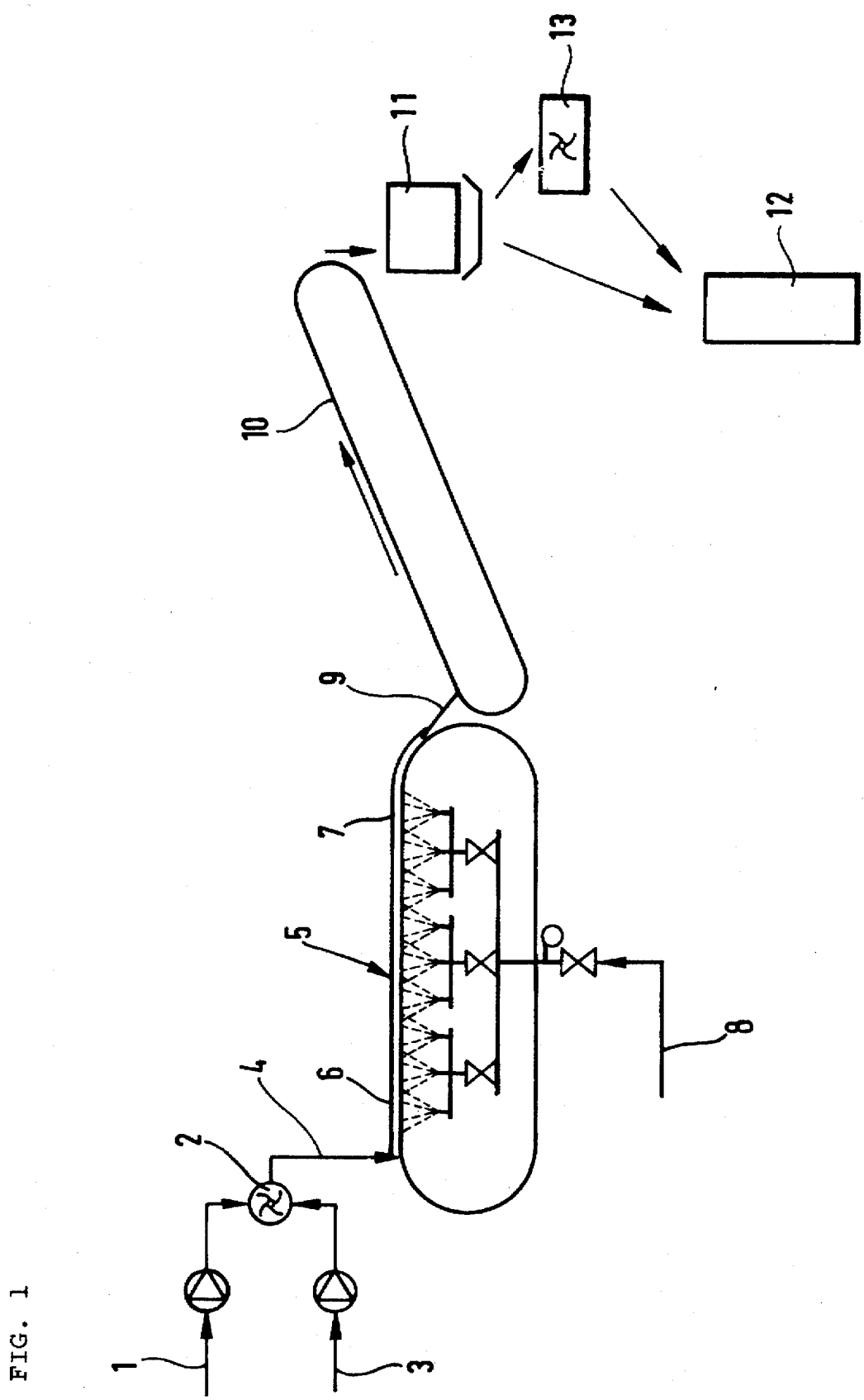
FIG. 1 shows a schematic layout of the process of the present invention.

A concentrated formaldehyde solution is prepared having a purity ranging from 80 to 89 wt %, preferably 84% at a temperature ranging from 80° to 100° C., by any of the known processes, particularly in this case by low pressure distillation of a dilute formaldehyde solution.

Through line 1 an amount ranging from 300 to 600 kg/hr of this concentrated formaldehyde is fed, depending on the desired production rate and other work variables indicated below, to a mixer 2 which is also fed with a dilute aqueous solution of catalyst, through line 3. The mixer 2 is designed to have an internal volume ranging from 100 to 150 ml, whereby with the stated formaldehyde flowrates, the dwell time of the mixture therein ranges from 0.5 to 2.5 seconds, which is sufficient time to achieve an intimate, perfectly homogenous mixture, but without the polymer precipitating. Both products may also be mixed by causing them to flow together into one line.

As catalysts strong basic hydroxides such as sodium, potassium and barium hydroxide, or certain amines having a pKa (pKa=14−pKb) ranging from 10.4 to 11.3 may be used. The amines of preferred use have already been listed above, it being highlighted that the most suitable are the secondary amines, which are used in the form of aqueous solutions of a concentration ranging from 10 to 25 wt %, in such an amount that the resulting amine concentration in the mixed product ranges from 6.0 to 20 meq/kg, preferably 9.5 meq/kg, depending on the type of amine used and the purity of the formaldehyde.

The homogenized mixture of the formaldehyde and catalyst solutions is uniformly spread through a distributor 4 over a stainless steel belt 5.

The 80–89 wt % purity formaldehyde solution comes preferably from a low pressure distillation plant of a dilute formaldehyde solution and is held at a temperature ranging between 80° and 100° C., to avoid its solidification, until poured on the metal belt 5. The belt is provided with first areas 6 where a temperature ranging from 70° to 90° C., preferably of 80° C., is maintained.

Cooling and subsequent solidification of the product thereon to an end temperature ranging from 25° to 35° C., preferably of 30° C., is carried out on a second area 7 of the belt 5.

The belt dimensions are set as a function of the desired production rate. A 10 m long, 1 m wide belt is sufficient for the rates mentioned above. Depending on these dimensions, the number of areas into which the belt is divided for heating or cooling varies from 3 to 6.

Since the speed of the belt is adjustable and the number of areas used for heating/cooling may be modified, the reaction and cooling times may be varied depending on how the hardness and temperature of the paraformaldehyde obtained evolves.

The dwell time of the paraformaldehyde on the belt varies from 3 to 6 minutes, with from ⅓ to ⅔ of this time being dedicated to the polymerization reaction and the remaining time to final cooling of the product.

Cooling may be achieved with process water supplied through a line 8, at a temperature ranging from 25° to 30° C., or with water chilled to 5°–10° C., depending on the speed of cooling desired.

Once the paraformaldehyde is sufficiently polymerized and cooling thereof is started, the product starts to craze alone progressively until it breaks away from the belt and may be easily stripped. Thus, the product comes away from the end of the belt without difficulty with the aid of a doctor blade 9, and is ready for packaging.

The paraformaldehyde obtained has the aspect of hard plates having an area of 1 to 10 sq.cm. and a thickness ranging from 1 to 4 mm. The temperature of the product at the end of the stainless steel belt is from 25° to 35° C.

This product is carried away on the conveyor belt 10 to the storage silo 11 from where it may be packed directly in a bagging machine 12 and marketed, or if other qualities of paraformaldehyde of different size are required, it must be forwarded on to a suitable crushing machine 13.

EXAMPLE 1

480 kg/h of an 80.4% formaldehyde solution held at 83° C. and 1.5 l/h of a 10% aqueous sodium hydroxide solution were placed in a straight-through mixer having a volume of 150 ml. The exiting mixture was spread over a 10 m long, 1 m wide moving stainless steel belt, running at a speed of 200 m/h. The operation was such that at the end of a first 3 meter long area of the belt the temperature was no lower than 72° (±2°). The operation was such that at the end of a second 2 m long area the temperature was 55° (±2°) and the remaining 5 m long third area was cooled with water at room temperature, so that the product ran off the end of the belt at 28°. From here the product is taken on the conveyor belt 10 to the storage silo, where it may be packaged directly, or it is taken to a mill for grinding to the required size.

EXAMPLE 2

320 kg/h of an 83.5% formaldehyde solution held at 85° C. and 2.2 l/h of an aqueous solution containing 124 g/l of n-propylamine were placed in the straight-through mixer having a volume of 120 ml. The exiting mixture was spread over a 10 m long, 1 m wide moving stainless steel belt, running at a speed of 120 m/h. The operation was such that at the end of a first 5 meter long area of the belt the temperature was no lower than 84° (±2°) and the remaining 5 m long second area was cooled with water at room temperature, so that the product ran off the end of the belt at 26°. From here the product is taken on the conveyor belt 10 to the storage silo, where it may be packaged directly, or it is taken to a mill for grinding to the required size.

EXAMPLE 3

480 kg/h of an 82.8% formaldehyde solution held at 85° C. and 1.8 l/h of a 22% aqueous diisopropylamine solution were placed in a straight-through mixer having a volume of 150 ml. The exiting mixture was spread over a 10 m long, 1 m wide moving stainless steel belt, running at a speed of 120 m/h. The operation was such that at the end of a first 5 meter long area of the belt the temperature was no lower than 78° (±2°) and the remaining 5 m long second area was cooled with water at room temperature, so that the product ran off the end of the belt at 26°. From here the product is taken on the conveyor belt 10 to the storage silo, where it may be packaged directly, or it is taken to a mill for grinding to the required size.

I claim:

1. A process for the manufacture of paraformaldehyde, particularly for the continuous manufacture of paraformaldehyde having a purity ranging from 80 to 89 wt %, said process comprising the following steps: providing a formaldehyde solution having a concentration substantially the same as the purity of the paraformaldehyde to be obtained; heating said solution to a temperature ranging from 80° C. to 100° C.; pouring said heated solution over a metal conveyor belt travelling from first heated zones to second chilled zones, said pouring being carried out on one of said first heated zones.

2. The process of claim 1, wherein said formaldehyde solution is placed in a mixer, followed by addition of a catalyst, wherein said formaldehyde solution and said catalyst are mixed together at a temperature ranging from 80° C. to 100° C., until an homogenized mixture is obtained; and, while maintaining said temperature range of from 80° C. to 100° C., said homogenized mixture is poured over said first heated zones of said metal belt conveyor.

3. The process of claim 2, wherein said catalyst is a strong basic hydroxide.

4. The process of claim 2, wherein said catalyst is an amine having a pKa ranging from 10.4 to 11.3.

5. The process of claim 4, wherein said amine is a primary amine selected from the group formed by methylamine, ethylamine, n-propylamine, n-butylamine, iso-butylamine and tert-butylamine.

6. The process of claim 4, wherein said amine is a secondary amine selected from the group formed by dimethylamine, diethylamine, di-n-propylamine, di-isopropylamine and dibutylamine.

7. The process of claim 4, wherein said amine is a tertiary amine selected from the group formed by triethylamine and triethanolamine.

8. The process of claim 4, wherein the amine concentration in said homogenized mixture ranges from 6.0 to 20.0 meq/kg.

9. The process of claim 8, wherein the amine concentration in said homogenized mixture is around 9.5 meq/kg.

10. The process of claim 1, wherein said first heated zones are held at a temperature ranging from 70° to 90° C.

11. The process of claim 1, wherein said second chilled zones are held at a temperature ranging from 25° to 35° C.

* * * * *

UNITED STATES PATENT AND TRADEMARK OFFICE
CERTIFICATE OF CORRECTION

PATENT NO. : 5,686,554
DATED : November 11, 1997
INVENTOR(S) : Luis Eek-Vancells It is certified that error appears in the above-indentified patent and that said Letters Patent is hereby corrected as shown below:

<u>Column 6</u>

Line 18, "A process for the manufacture" should be --A process for the continuous manufacture--;

Lines 19 and 20, delete "particularly for the continuous manufacture of paraformaldehyde";

Line 43, "formed by" should be --consisting of--;

Line 47, "formed by" should be --consisting of--;

Line 51, "formed by" should be --consisting of--.

Signed and Sealed this

Twenty-seventh Day of January, 1998

Attest:

BRUCE LEHMAN

*Attesting Officer*   *Commissioner of Patents and Trademarks*